May 27, 1941.  W. F. WELLS  2,243,303
SAWING MACHINE
Filed Dec. 6, 1937  3 Sheets-Sheet 2
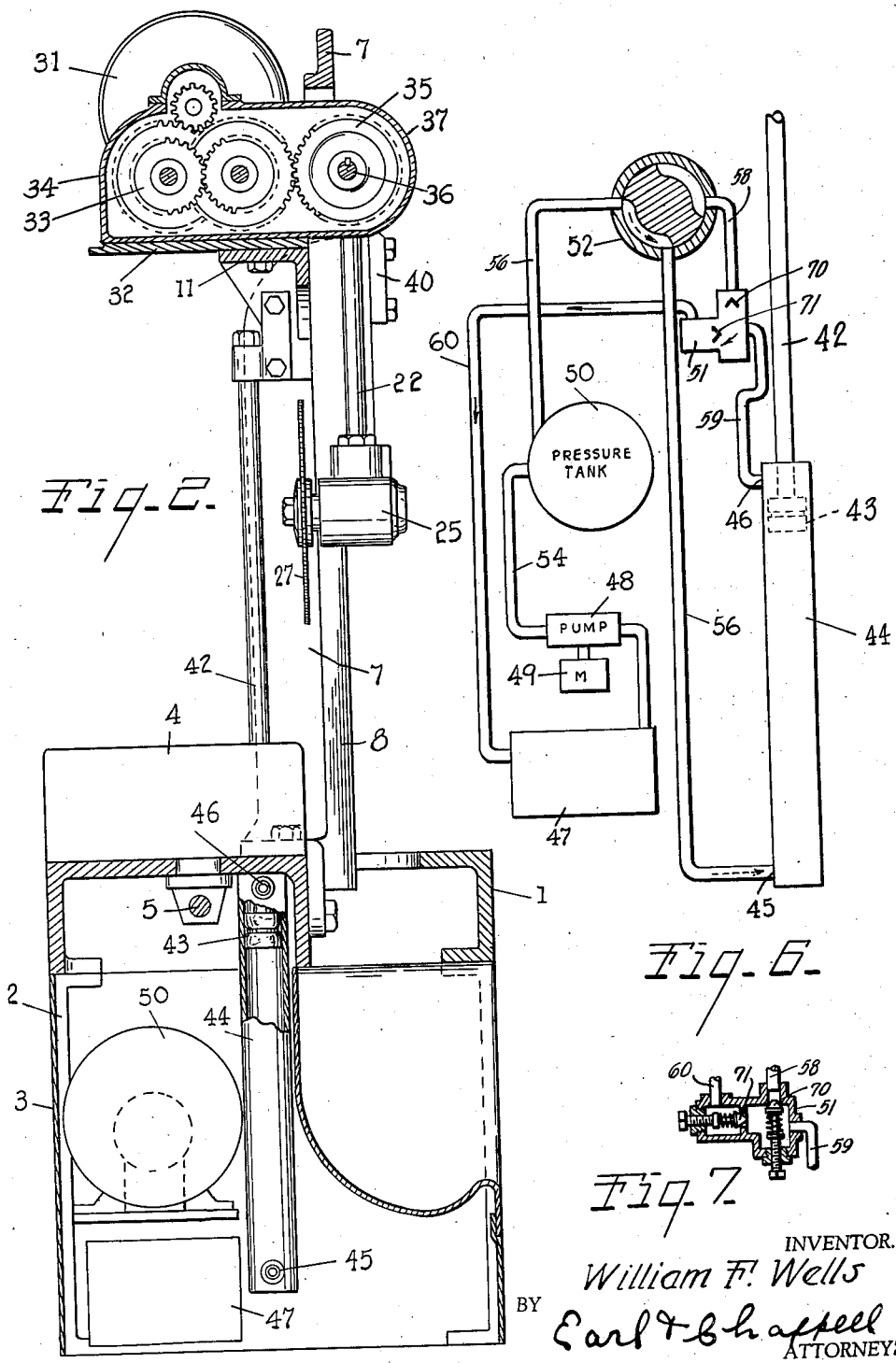
INVENTOR.
William F. Wells
BY Earl & Chappell
ATTORNEYS

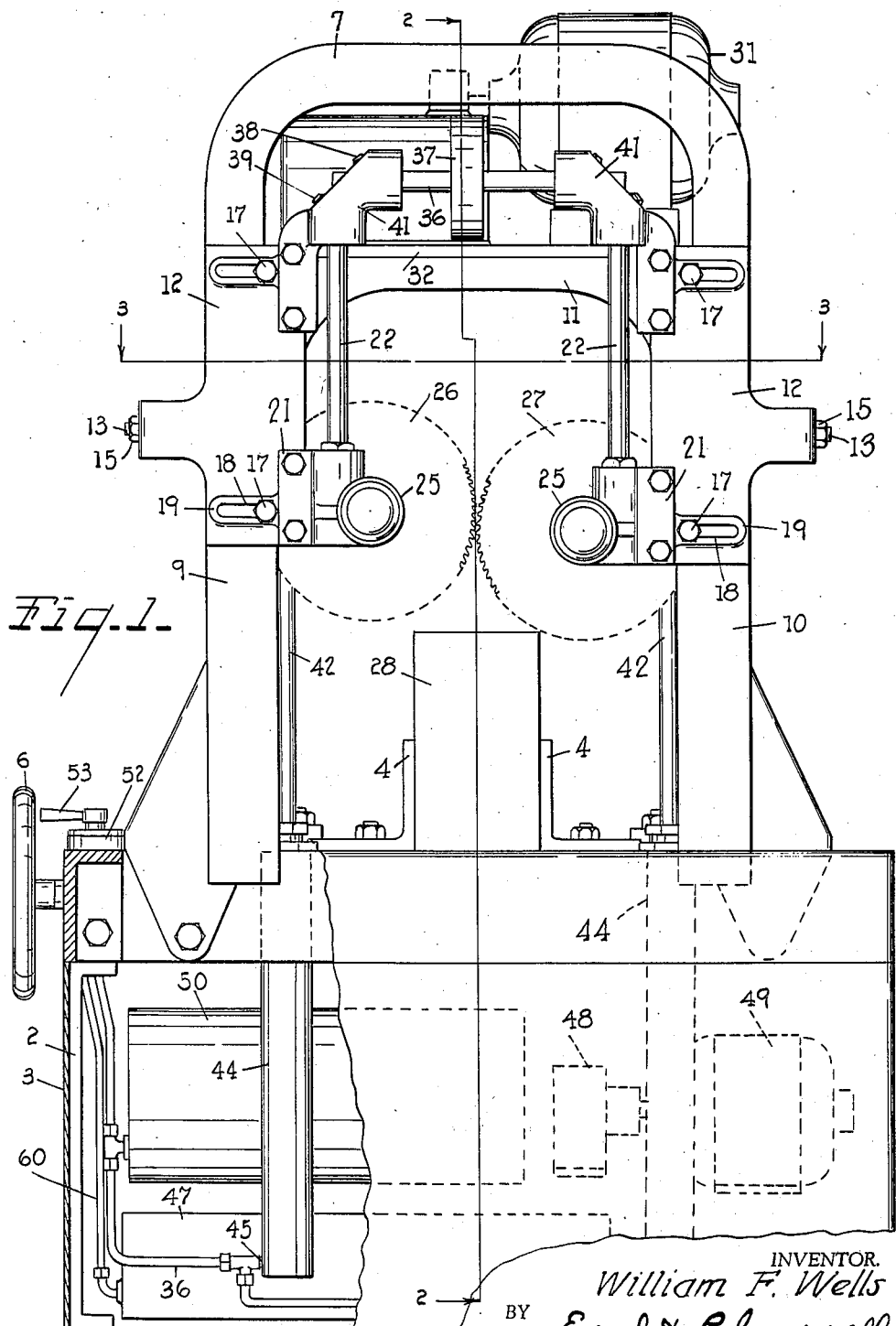

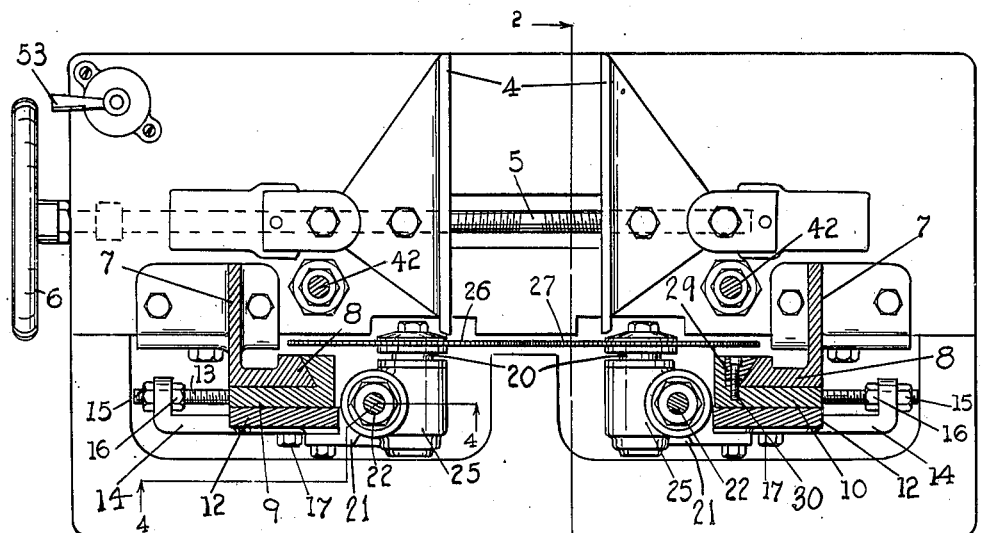
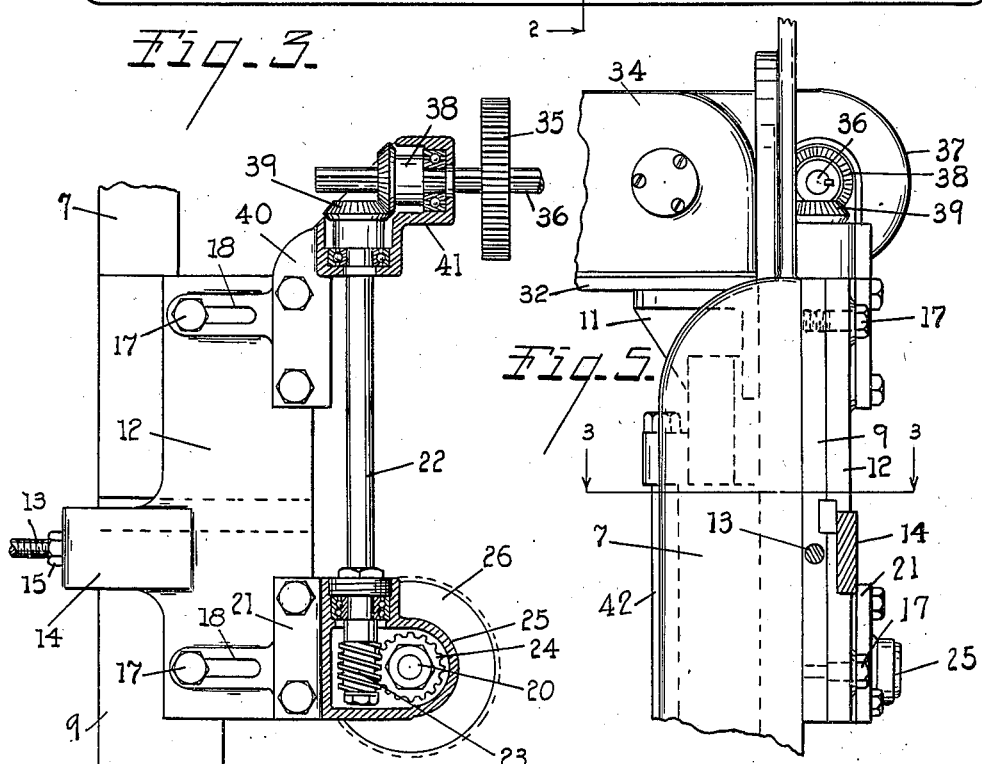

Patented May 27, 1941

2,243,303

UNITED STATES PATENT OFFICE 2,243,303

SAWING MACHINE

William F. Wells, Three Rivers, Mich.

Application December 6, 1937, Serial No. 178,254

10 Claims. (Cl. 29—70)

This invention relates to improvements in sawing machines.

The main objects of this invention are:

First, to provide a sawing machine well adapted for sawing metal which is also well adapted for sawing or cutting relatively large pieces of metal with a minimum of strain upon the saws and upon the apparatus.

Second, to provide a sawing machine which is capable of quite a wide range of adjustment and adaptation.

Third, to provide a sawing machine which is very strong and durable with the parts arranged so that the strains thereon in use are to a considerable extent counteracted.

Fourth, to provide a sawing machine having novel elevating and lowering provisions to control the travel thereof in operation.

Further objects pertaining to details and economies of the invention will definitely appear from the description to follow. The invention is defined in the claims.

A structure which embodies the features of my invention is clearly illustrated in the accompanying drawings in which:

Fig. 1 is a front elevation of a structure embodying the features of my invention, a portion of the bed and housing being broken away to disclose the parts within.

Fig. 2 is a vertical section on line 2—2 of Figs. 1 and 3.

Fig. 3 is a horizontal section on line 3—3 of Figs. 1 and 3.

Fig. 4 is an enlarged detail view partially in vertical section on line 4—4 of Fig. 3 showing details of the saw driving means and of the mounting thereof.

Fig. 5 is an enlarged fragmentary side elevation partially sectioned.

Fig. 6 is a diagrammatic view of the feed control.

Fig. 7 is a fragmentary view in vertical section conventionally illustrating a pressure reducing or throttling valve contemplated as an element in the apparatus of my invention.

In the embodiment illustrated in the accompanying drawings the bed or work table 1 is supported by legs 2, housing panels 3 being provided below the bed to enclose the control mechanism and certain parts. The bed is provided with a pair of work holders or work clamping jaws 4 disposed in opposed relation and simultaneously adjusted to and from each other by means of the reversely threaded screw 5 arranged within the bed and provided with a hand wheel 6 at the end thereof. The spaced uprights 7 mounted on the bed are provided with ways 8 for the carriage which comprises the way engaging members or slides 9 and 10 connected at their upper ends by a cross or head piece 11.

Mounted on the carriage is a pair of saw slides or saw supporting brackets 12 supported for adjustment transversely of the path of travel, fine or accurate adjustment being accomplished by means of the adjusting screws 13 disposed through the arms 14 on the saw slides and angled to receive the screws, see Fig. 3. Nuts 15 and 16 are provided on opposite sides of the angled ends of the arms for adjustment and securing the parts in their adjusted position. Clamping screws 17 are provided arranged through slots 18 in the bosses 19 on the saw slides.

The saw arbors 20 are carried by the brackets 21 on the saw slides or saw supporting brackets, these supporting brackets 21 for convenience in manufacture being formed separately of the saw supporting brackets 12 and provided with suitable bearings for the saw arbors and for the lower ends of the driven shafts 22. These driven shafts 22 are provided with worm gears 23 coacting with the worm pinions 24 on the saw arbors. The brackets 21 are provided with housings or gear boxes 25 for the bearings and the driving gears.

The saws 26 and 27 are mounted on their arbors in the same plane, as shown in Fig. 3, but with the saw 27 slightly in advance of the saw 26. The purpose of this is to permit the saws to be so adjusted relative to each other that a complete cut is made across the work indicated at 28, Fig. 1, without the teeth of the saws or cutters clashing, that is, the kerfs or cuts of the saws overlap sufficiently to insure a complete cut across the work.

The way engaging members or slides 9 and 10 of the carriage are provided with semi-dovetailed engaging portions as shown in Fig. 3, the member 10 having an adjusting bearing member 29 coacting with its carriage way and being beveled to coact with the beveled portion of the carriage way and provided with adjusting screws 30 to take up wear, insure a close fit and prevent chatter or vibration of the carriage upon its ways.

The driving means for the saws preferably comprises the motor 31 mounted upon the platform 32 carried by the cross piece or head 11 of the carriage and a transmission shown conventionally at 33 within a housing 34 on the platform. The transmission is not described in detail as it will be understood that a suitable transmission may be provided according to the motor capacity, the desired saw speed, and the like. The transmission drives the gear 35 on the countershaft 36. This gear 35 is arranged in the extension 37 on the transmission housing and the countershaft 36 is arranged through this extension. The countershaft is connected to the driven shafts 22 by means of the beveled gears 38 on the ends of the countershaft coacting with the beveled gears 39 on the upper ends of the shafts 22. The countershaft is supported at its ends by brackets 40 mounted on the carriage slides. These brackets have housings 41 for the bearings and the gears.

With this arrangement of parts the saws may be properly adjusted to and from each other on the carriage and they are supported so that the thrust and strains in operation are quite uniformly distributed. As will be observed, the weight of the carriage and the parts thereon tends to feed the saws to the work and, in fact, it is desirable to control the feed. In the embodiment illustrated I accomplish this by hydraulic means.

The hydraulic means of the embodiment illustrated consists of plungers 42 carried by the carriage and provided with plunger heads 43 disposed within the cylinders 44 housed below the bed. The feed is controlled by controlling the discharge of the fluid from the lower ends of these cylinders and when the saws are in cutting position it may be desirable to add feed pressure to the plungers. This is effected by controlling the delivery and discharge of the actuating fluid from the ports 45 and 46 at the lower and upper ends of the cylinders, respectively.

In the diagrammatic view shown in Fig. 6, 47 indicates the sump or supply, 48 a pump which is driven from a motor 49, Fig. 1, 50 a pressure tank, 51 a pressure reducer and 52 a control valve. This control valve is provided with an actuating handpiece 53. The pump is connected to the supply tank or sump and delivers to the pressure tank through the conduit 54. The pressure tank is connected to the lower end of cylinder 44 by means of conduit 56, through the two-way manually actuated control valve 52, this conduit 56 being open through the valve when the latter is in the position illustrated in Fig. 6, but blocked off between the pressure tank and cylinder in the other position of the valve 52 a predetermined number of degrees from the position of Fig. 6. The conduit 58 is communicated with the cylinder connected portion of conduit 56 by the valve when the latter is manipulated to said last named other position, but is in turn blocked off in the Fig. 6 position of the valve. Conduit 58 leads to the pressure reducing or throttle valve 51, details of the internal structure of which are illustrated in Fig. 7. A further conduit 59 connects this reducing valve with the upper end of cylinder 44 and a still further conduit 60 leads from the reducer to sump 47.

Fig. 7 illustrates the relation of the various conduits aforesaid to the reducer 51. The reference numeral 70 designates a valve member which is spring loaded to yield at an arbitrary point, say under 80 lbs. liquid pressure, to thereby communicate conduit 58 with the interior of the valve and also with conduit 59 leading to the top of the cylinder. The figure of 80 lbs. is selected on the assumption that plunger 43 will create a hydraulic pressure greater than that as it descends. The reference numeral 71 designates a further valve member spring loaded to yield at a much reduced pressure, for example, 15 or 20 lbs., and thereby communicate the interior of the valve with conduit 60 leading to the sump. I claim no invention in this particular type of valve, it being merely a suitable device for effecting a reduction in the pressure effective on the top of the cylinder and communicated therewith from the bottom of the cylinder as the plunger 43 descends. While the weight of the saw is sufficient to cause the same to descend through work being cut, I have discovered that if a certain relatively small hydraulic pressure is applied to the top of the plunger in its descent an otherwise present tendency to chatter and vibrate excessively is effectively damped and the saw descends smoothly and continuously through the work.

In operation, to elevate the plunger 43 and carriage, the hand control is turned to the position indicated in Fig. 6, whereupon the pressure tank is communicated with the cylinder to raise the plunger, during which time liquid on top of the plunger is forced out through conduit 59 into reducer 51 and readily springs valve member 71 so as to enable the liquid to exhaust through conduit 60 to the sump. Valve member 70 is obviously maintained closed during this period.

On the descent of the plunger and carriage, the valve 52 is turned to its other position communicating conduits 56 and 58 and blocking off the portion of the former connected to the pressure tank. Liquid accordingly travels through conduit 56, valve 52, and conduit 58, and since for the assumed loading of valve member 70 the pressure produced by the descent of the saw is greater than the arbitrary figure of 80 lbs. per sq. in., valve 70 will be forced open allowing the liquid at 80 lbs. or more to enter valve 51. However, valve member 71 bleeds off a large part of this pressure, i. e., all that in excess of, say, 15 or 20 lbs., to the sump through the conduit 60, with the result that the pressure effective on the top of the cylinder and communicated therewith through conduit 59 is maintained small, but sufficiently great to prevent the vibration and chatter referred to above.

The foregoing fluid connections provide means for controlling the lowering of the carriage by communicating the exhaust from one side thereof to the other side during the lowering operation. It will be understood that the operation of pump 48 is controlled in accordance with the travel of the carriage, whereby pressure is built up in tank 50 in order to elevate plunger 43. Suitable means for this purpose will suggest themselves to those skilled in the art and in practice I employ a switch which is actuated when the carriage reaches its lowermost point to start motor 49 and bring pump 48 into operation. When the carriage reaches the uppermost point in its travel, the motor is automatically stopped by suitable provision, the downward travel of the carriage then being under the control of valve 52. In Fig. 6, the dotted line arrows illustrate the direction of flow when the carriage is being elevated, the solid line arrows illustrating the flow of exhaust from the upper side of the cylinder to sump 47. When valve 52 is manipulated for the lowering or operative stroke of the saws the carriage is thus lowered against the pressure still existent under the pistons. This last named pressure may be further controlled by throttling in the two-way valve, if desired. The aforesaid downward feed of the saws is automatically and silently controlled hydraulically, being slowed up by increased resistance in cutting but not unduly accelerated when cutting through a section of lighter stock.

I have illustrated and described my improvements in a very practical embodiment. I have not attempted to illustrate certain modifications and adaptations which I contemplate as it is believed this disclosure will enable those skilled in the art to embody or adapt my invention as may be desired.

Having thus described my invention what I claim as new and desire to secure by Letters Patent is:

1. In a sawing machine, the combination of a bed provided with a work centering holder comprising opposed work clamps and a reversely threaded screw for simultaneously adjusting said clamps, upright ways, a carriage slidable on said ways and comprising way engaging slides and a cross piece at the upper ends thereof, saws provided with arbors, saw supporting brackets mounted on said carriage for adjustment to and from each other and provided with adjusting screws, the saws being disposed in the same plane and with one slightly in advance of the other and so that they coact to make a complete cut across the work, and means for driving said saws comprising a motor and a transmission mounted on said cross piece on said carriage, a countershaft having a gear thereon driven from said transmission, a pair of shafts driven from said countershaft and having beveled gear connections therewith and worm and pinion connections with said saw arbors, lower bearing brackets for said saw arbors and driven shafts mounted on said saw supporting brackets, and upper bearing brackets mounted on said saw supporting brackets and having bearings for the ends of said countershaft and the upper ends of said driven shafts.

2. In a sawing machine, the combination of a bed, upright ways, a carriage slidable on said ways and comprising way engaging slides and a cross piece at the upper ends thereof, saws provided with arbors, saw supporting brackets mounted on said carriage for adjustment to and from each other, the saws being disposed in the same plane and with one slightly in advance of the other and so that they coact to make a complete cut across the work, and means for driving said saws comprising a motor and a transmission mounted on said cross piece on said carriage, a countershaft having a gear thereon driven from said transmission, a pair of shafts driven from said countershaft and having beveled gear connections therewith and worm and pinion connections with said saw arbors, lower bearing brackets for said saw arbors and driven shafts mounted on said saw supporting brackets and provided with gear boxes for said worm and pinion gears, and upper bearing brackets mounted on said saw supporting brackets and having bearings for the ends of said countershaft and the upper ends of said driven shafts.

3. In a sawing machine, the combination of a work table, ways, a carriage slidable on said ways and comprising way engaging slides and a cross piece at the upper ends thereof, saws provided with arbors, saw supporting brackets mounted on said carriage for adjustment to and from each other and provided with adjusting screws, the saws being disposed in the same plane and with one slightly in advance of the other and so that they coact to make a complete cut across the work, and means for driving said saws comprising a motor and a transmission mounted on said cross piece on said carriage, a countershaft having a gear thereon driven from said transmission, and a pair of shafts carried by said saw supporting brackets driven from said countershaft and having beveled gear connections therewith and worm and pinion connections with said saw arbors.

4. In a sawing machine, the combination of a work table, ways, a carriage slidable on said ways and comprising way engaging slides and a cross piece at the upper ends thereof, saws provided with arbors, saw supporting brackets mounted on said carriage for adjustment to and from each other, the saws being disposed in the same plane and with one slightly in advance of the other and so that they coact to make a complete cut across the work, and means for driving said saws comprising a motor and a transmission mounted on said cross piece on said carriage, a countershaft having a gear thereon driven from said transmission, and a pair of shafts carried by said saw supporting brackets driven from said countershaft and having beveled gear connections therewith and worm and pinion connections with said saw arbors.

5. In a sawing machine, the combination of a bed, upright ways, a carriage slidable on said ways and comprising way engaging slides and a cross piece at the upper ends thereof, saws provided with arbors, saw arbor supporting brackets mounted on said carriage to support the saws in the same plane and with one slightly in advance of the other and so that they coact to make a complete cut across the work, said brackets being mounted on said carriage for adjustment to and from each other, and means for driving said saws comprising a motor mounted on said carriage, a countershaft carried by said carriage and having driving connection with said motor, a pair of shafts driven from said countershaft and having driving connections with said saw arbors, said saw supporting brackets being provided with bearings for said driven shafts and with housings for the driving connections for said driven shafts to said arbors and with bearings for the ends of said countershaft and the upper ends of said driven shafts.

6. In a sawing machine, the combination of a bed, a reciprocatingly mounted carriage, saws provided with arbors, saw arbor supporting brackets mounted on said carriage to support the saws in the same plane and with one slightly in advance of the other and so that they coact to make a complete cut across the work, said brackets being mounted on said carriage for adjustment to and from each other, and means for driving said saws comprising a countershaft carried by said carriage, a pair of shafts driven from said countershaft and having beveled gear connections therewith and worm and pinion connections with said saw arbors, said saw supporting brackets being provided with bearings for said driven shafts and with gear boxes for said worm and pinion gears, and bearing brackets mounted on said saw supporting brackets and having bearings for the ends of said countershaft and the upper ends of said driven shafts.

7. In a sawing machine, the combination of a bed, a reciprocatingly mounted carriage, saws provided with arbors, saw arbor supporting brackets mounted on said carriage to support the saws in the same plane and with one slightly in advance of the other and so that they coact to make a complete cut across the work, said brackets being mounted on said carriage for adjustment to and from each other, and means for driving said saws comprising a countershaft carried by said carriage and a pair of arbor driving shafts carried by said carriage and driven from said countershaft.

8. In a sawing machine, the combination of a work bed, a saw carriage mounted to travel at an angle to the face of said bed, a pair of saws mounted on said carriage in the same plane with one saw slightly in advance of the other, the saws being supported relative to each other so that they coact to make a complete cut across the work, means for adjustably supporting said saws on said carriage, means for driving said saws as the carriage is fed to the work, and means for controlling the feed of said saws including a plunger on said carriage, a cylinder coacting with said plunger, means for admitting the exhaust of actuating fluid from one side of said cylinder to the opposite side thereof to control the feed of the carriage, and means for supplying fluid to said one side to control the return of the carriage.

9. In a sawing machine, the combination of a work bed, a saw carriage mounted to travel at an angle to the face of said bed, a pair of saws mounted on said carriage in the same plane with one saw slightly in advance of the other, the saws being supported relative to each other so that they coact to make a complete cut across the work, means for driving said saws as the carriage is fed to the work, and means for controlling the feed of said saws including a plunger on said carriage, a cylinder coacting with said plunger, means for admitting the exhaust of said actuating fluid from one side of said cylinder to the opposite side thereof to control the feed of the carriage, and means for supplying fluid to said one side to control the return of the carriage.

10. In a sawing machine, a work bed, a saw carriage, a saw on said carriage, means for mounting said carriage for gravital travel relative to the work bed to cut work on the latter, and hydraulic means for controlling said travel and for elevating the carriage, comprising a plunger on the carriage, a fluid cylinder coacting with the plunger, means for supplying fluid under pressure to one side of said cylinder to drive the plunger and carriage in one direction, and means for admitting the exhaust actuating fluid from said one side of the cylinder to the opposite side of the cylinder under reduced pressure during movement of the carriage in the other direction.

WILLIAM F. WELLS.